United States Patent

Matthies

[15] 3,661,444
[45] May 9, 1972

[54] COMPOUNDED LIQUID CRYSTAL CELLS

[72] Inventor: Dennis Lee Matthies, Princeton, N.J.
[73] Assignee: RCA Corporation
[22] Filed: Dec. 2, 1969
[21] Appl. No.: 881,417

[52] U.S. Cl. ................................................350/160, 350/267
[51] Int. Cl. ..........................................................G02f 1/28
[58] Field of Search ........................350/150, 157, 160, 267

[56] References Cited

UNITED STATES PATENTS

| | | | |
|---|---|---|---|
| 3,257,903 | 6/1966 | Marks | 350/267 |
| 3,200,525 | 8/1965 | Francis | 350/285 |
| 3,322,485 | 5/1967 | Williams | 350/160 |

Primary Examiner—David Schonberg
Assistant Examiner—Michael J. Tokar
Attorney—Glenn H. Bruestle

[57] ABSTRACT

A linear array of compounded liquid crystal cells comprises a first plurality of linearly aligned cells formed between the opposite surfaces of a pair of parallel plates and a second plurality of linearly aligned (compounding) cells formed between a surface of one of the pair of plates and a third parallel plate. The cells are filled with liquid crystals, and each liquid crystal cell is defined by a pair of oppositely disposed light-transmitting electrodes on the opposite surfaces, respectively, of the plates that form the cell.

1 Claim, 3 Drawing Figures

PATENTED MAY 9 1972
3,661,444
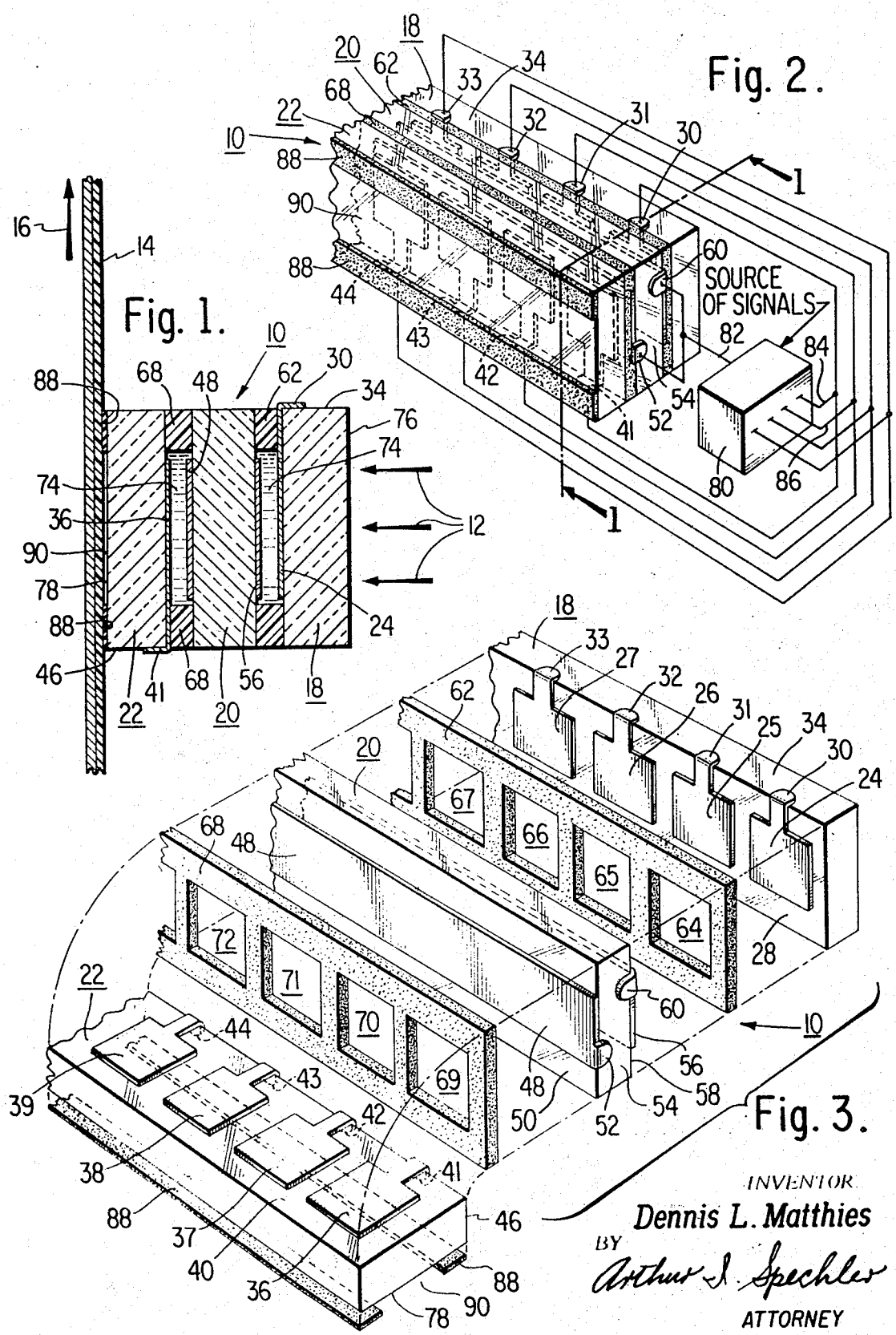
INVENTOR.
Dennis L. Matthies
BY
Arthur J. Spechler
ATTORNEY

COMPOUNDED LIQUID CRYSTAL CELLS

BACKGROUND OF THE INVENTION

Thermotropic nematic liquid crystals are liquids with elongated polar molecules. One type of such crystals normally align themselves in an electric field so that their nearest neighbors are parallel to each other. This alignment causes a change in the light scattering properties of these materials. In another type of such crystals, turbulence is caused when placed between two transparent electrodes and an electric current is sent through them, disturbing the ordered state and causing the scattering of light directed onto the crystals. The effective operation of liquid crystals as light valves is limited to a temperature range depending upon the liquid crystal material used; but, regardless of the type of liquid crystal material used, a change in the optical properties of the liquid crystal material is effected by the application of an electric field. In the type of liquid crystals exhibiting turbulence, an electric current is also necessary to change their optical properties.

It has been proposed to expose a light-sensitive recording element with modulated light from an array of liquid crystal cells. In such a system, however, it is desirable to scatter as large a fraction of the light source when the liquid crystals are in a light-scattering state. The light-scattering ability of a liquid crystal cell, that is, the obtainable contrast, can be increased by increasing the thickness of the cell, but, in so doing the time needed to switch from the light-scattering state to the transparent state is increased approximately as the square of the thickness of the cell. Hence, the thickness of each liquid crystal cell is a compromise between its light-scattering (contrast) efficiency and the writing (turn-off and turn-on time) speed.

The novel compounded liquid crystal cells are an improvement over prior-art liquid crystal cells in that the compounded cells provide means for improving the contrast efficiency without sacrificing writing speed.

SUMMARY OF THE INVENTION

Compounded liquid crystal cells comprise a set of at least two cells, one cell being disposed behind the other, that is, in tandem alignment, so that a ray of light directed through one of the cells in the set must pass through the other cell of the set. Novel arrays of compounded liquid crystal cells may comprise first and second pluralities of liquid crystal cells. Each plurality of cells has a similar alignment and is parallel to the other plurality of cells so that a ray of light directed through one of the cells in the first plurality must also pass through a cell in the second plurality.

BRIEF DESCRIPTION OF THE DRAWINGS

FIG. 1 is a vertical cross-section of an improved array of compounded liquid crystal cells, taken along the plane indicated by the dashed line 1—1 in FIG. 2, showing the array disposed between a light source and a fragment of a light-sensitive recording element;

FIG. 2 is a fragmentary perspective view of the novel array of compounded liquid crystal cells, viewed from the front, top, and right side, showing schematically a source of signals electrically connected to sets of compounded liquid crystal cells; and FIG. 3 is a fragmentary exploded perspective view of the novel array of compounded liquid crystal cells shown in FIG. 2.

DESCRIPTION OF THE PREFERRED EMBODIMENTS

Referring now to the drawing, there is shown a novel linear array 10 of individually addressed compounded liquid crystal cells disposed between a light source 12, indicated by arrows, and a light-sensitive recording element 14, such as an electrophotographic recording element commonly used in the electrophotographic printing art. The recording element 14 is adapted to be moved vertically across the array 10 in the direction of an arrow 16 by any suitable means, not shown. In describing the novel array 10, the descriptive terms of direction, such as "vertical," "horizontal," "front," and "back," for example, are merely relative, it being within the contemplation of the present invention to orient the array 10 in any desired position as necessitated by the applications and equipment in which it is incorporated as a part.

The array 10 comprises a plurality of parallel walls or plates, such as a rear plate 18, a middle plate 20 and a front plate 22. The plates are of a light-transmitting material, such as glass or plastic material, each having a thickness of about 60 mils, a height of about one inch, and a width depending upon the number of liquid crystal cells desired. It is within the contemplation of the present invention to provide an array 10 of liquid crystal cells capable of exposing a recording element having the width of a typical page, that is, about 8 ½ inches.

A plurality of separated linearly aligned electrodes 24, 25, 26, and 27 of a light-transmitting, electrically conductive material, such as tin oxide or indium oxide, for example, is disposed on the front surface 28 of the back plate 18. Each of the electrodes 24–27 has a connecting lead 30, 31, 32, and 33, respectively, that terminates on the upper edge 34 of the back plate 18 for applying electrical connections thereto. Each of the electrodes 24–27 is in the form of a square of about 10 × 10 mils, and each is separated from an adjacent electrode by a distance of about 1 mil. These dimensions, as well as other, unless stated otherwise are not critical and are given merely for illustrative purposes.

A plurality of light-transmitting, electrically conductive electrodes 36, 37, 38, and 39, similar to the electrodes 24–27, are disposed on the rear surface 40 of the front plate 22. The electrodes 36–39 have connecting leads 41, 42, 43, and 44, respectively, that terminate on the lower edge 46 of the front plate 22 for applying electrical connections thereto.

A front common electrode 48 is disposed on the front surface 50 of the middle plate 20. The front common electrode 48 extends the entire width of the middle plate 20 and is formed with a terminal connecting lead 52 that extends to the right edge 54 of the middle plate 20. A rear common electrode 56, similar to the front common electrode 48, is disposed on the rear surface 58 of the middle plate 20. The rear common electrode 56 is formed with a terminal connecting lead 60 that also extends to the right edge 54 of the middle plate 20 for applying an electrical connection thereto. It is also within the contemplation of the novel array 10 to employ a plurality of separate electrodes instead of common electrodes.

Spacer means are provided to dispose the plate 18, 20 and 22 parallel to each other and to provide a plurality of chambers or cells for the liquid crystal material. To this end, a spacer 62 of light-absorbing sheet material, such as black Teflon plastic material, is formed with a plurality of rectangular openings 64, 65, 66, and 67. Each of the openings 64–67 has a dimension of about 10 × 10 mils, separated from each other by a distance of 1 mil, and adapted to "frame" the electrodes 24–27 when the spacer 62 is placed against the front surface 28 of the back plate 18. The thickness of the spacer 62 is between one quarter and one half mil. A spacer 68, similar to the spacer 62 is formed with a plurality of linearly aligned openings 69, 70, 71, and 72 that are adapted to "frame" the electrodes 36–39, respectively, when the spacer sheet 68 is placed against the rear surface 40 of the front plate 22. The spacer 68 is also of light-absorbing sheet material having a thickness between one-quarter and one-half mil.

The openings 64–67 in the spacer 62, together with the front surface 28 of the back plate 18 and the rear surface 58 of the middle plate 20, are adapted to provide cells for liquid crystal material when the spacer 62 is sandwiched between the rear plate 18 and the middle plate 20. To this end, the spacer 62 is disposed on the rear surface 28 of the back plate 18 so that the openings 64–67 "frame" the electrodes 24–27, respectively. The spacer 62 may be adhered to the surface 28 by any suitable adhesive, such as epoxy adhesive. The openings 64–67 are now filled with a suitable liquid crystal material 74 (FIG. 1), to be discussed hereinafter in greater detail, and the rear surface 58 of the middle plate 20 is aligned over the spacer 62 and adhered thereto. The rear plate 18 and the middle plate 20 may be adhered simultaneously to a Teflon spacer 62 by heating a laminated sandwich thereof and polyethylene gaskets (not shown) between the spacer 62 and the plates 18 and 20 to a temperature of about 110° C. and maintaining the temperature until the polyethylene gaskets fuse to the spacer 62 and to the plates 18 and 20 to form a permanent seal therewith. Any other suitable adhesive may also be used in place of the polyethylene gaskets. Each of the cells formed by the openings 64–67 in the spacer 62, together with a pair of oppositely disposed electrodes in each opening, defines a liquid crystal cell.

The spacer 68 is adhered to the rear surface 40 of the front plate 22 by any suitable adhesive. The openings 69–72 are filled with a suitable liquid crystal material 74 and the surface 50 of the middle plate 20 is sealed to the spacer 68. The "sandwich" of the front plate 22, the spacer 68, and the middle plate 20 can be sealed permanently in the same manner as described above for sealing the spacer 62 to the plates 18 and 20. Each of the cells formed by the openings 69–72, together with a pair of oppositely disposed electrodes within each cell, as for example, electrodes 36 and 48 in the cell formed by the opening 69 and the spacer 68, defines a liquid crystal cell.

Although the spacers 62 and 68 are described and illustrated herein as comprising a plurality of openings, one for each pair of oppositely disposed electrodes, it is also within the contemplation of the present invention to use spacers with one or more openings wherein more than one pair of oppositely disposed electrodes is included in a chamber. In the latter case, it is advantageous to coat the surface of the plates around the electrodes with a light-absorbing material, such as black paint. If the spacers 62 and 68 are not originally of a light-absorbing material, they may be made so by applying to them a light-absorbing paint or adhesive. Regardless, however, of the number of openings in a spacer, each pair of oppositely disposed electrodes in a chamber defines a liquid crystal cell.

The liquid crystal material 74 may be a single, organic, thermotropic, nematic compound, such as a p-anisal p'-amino-phenylacetate

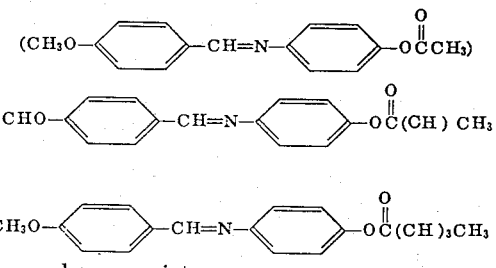

for example, or a mixture, such as a mixture of equal parts, by weight, of the three aforementioned compounds. When the liquid crystal material 74 consists of a mixture of equal parts, by weight, of the aforementioned three compounds, it has the advantages of a low crystal mesophase transition temperature (25° C.) and a wide operating temperature range (25°– 105° C.) in which the mesophase is stable. Other liquid crystal materials suitable for use in the novel array 10 are described in a U.S. Pat. No. 3,322,485, issued to R. Williams on May 30, 1967 for ELECTRO-OPTICAL ELEMENTS UTILIZING AN ORGANIC NEMATIC COMPOUND, and a pending patent application, Ser. No. 627,515, filed on Mar. 31, 1967.

Referring now particularly to FIG. 2, there is shown schematically a circuit for operating the novel array 10 of compounded liquid crystal cells. A source 80 of signals, such as from the output of a computer or a facsimile system, for example, is connected to the array 10 to energize the liquid crystal cells in each set of compounded liquid crystal cells simultaneously. Thus, to operate one set of compounded liquid crystal cells, one output terminal 82 of the signal source 80 is connected in parallel with the front and back common electrodes 48 and 56, via terminal leads 52 and 60, respectively; and another output terminal 84 of the signal source 80 is connected in parallel to the leads 41 and 30 of the electrodes 36 and 24 on the plates 22 and 18, respectively. To operate the next set of liquid crystal cells, another output terminal 86 of the signal source 80 is connected in parallel with the leads 42 and 31 of the electrodes 37 and 25 on the plates 22 and 18, respectively. In a similar manner the remaining sets of compounded liquid crystal cells are connected so that both of the liquid crystal cells in each set can be either energized and deenergized simultaneously.

Masking means are provided to absorb light that does not pass directly between oppositely disposed electrodes in a set of compounded liquid crystal cells. To this end, a mask 88 is disposed on the front surface 78 of the front plate 22. The mask 88 comprises a pair of spaced apart parallel strips of a light-absorbing material, such as black paint, for example, separated by a slit 90 through which light rays directed through the array 10 pass.

In operation, the array 10 is illuminated by the light source 12 so that light rays are directed, e.g., perpendicularly, to the rear surface 76 (FIG. 1) of the back plate 18. When both of the compounded liquid crystal cells in a set are in their transparent state, light from the light source 12 passes directly through them, as shown in FIG. 1, and strikes the light-sensitive recording element 14 which is in substantial contact with the front surface 78 of the front plate 22. When both of the compounded liquid crystal cells in a set are in a light-scattering state, as when each pair of oppositely disposed electrodes in each of the compounded liquid crystal cells is energized from the signal source 80, light from the light source 12 is scattered, and the light output is diminished to a point where the recording element 14 is not exposed.

By providing the novel array 10 with a plurality of sets of compounded liquid crystal cells, a direct ray of light passing through any set is not only scattered by a rear liquid crystal cell of the set, but is also scattered by a front (compounding) liquid crystal cell in the set. Hence, the contrast efficiency between transmitted light and scattered light through the array 10 is greatly improved without decreasing the writing speed and without increasing the voltage to energize a liquid crystal cell.

While the novel array of the individually addressed compounded liquid crystal cells has been described and illustrated herein as comprising a plurality of sets of compounded liquid crystal cells wherein each set included two liquid crystal cells, it is within the contemplation of the present invention to include sets of compounded liquid crystal cells wherein the number of liquid crystal cells is greater than two. Also, it is within the scope of the present invention to energize the liquid crystal cells in each set either simultaneously or selectively. When each of the liquid crystal cells in a set is energized selectively, it is possible to scatter only a portion of the light, as by the energization of only one cell in a set of two cells, for example, so that the intensity of light reaching the recording element may be controlled. In the latter mode of operation, the intensity of the exposure of a light-sensitive recording element by the novel array of compounded liquid crystal cells can be controlled to provide developed images exhibiting a grey scale characteristic.

I claim:

1. A linear array of compounded liquid crystal cells, for selectively exposing a light-sensitive recording element adapted to be moved transversely to said linear array, comprising:

first, second, and third plates, each being of a light-transmitting material and having front and rear surfaces, first spacer means separating the front surface of said first plate from the rear surface of said second plate and forming a first plurality of chambers for liquid crystals disposed in a single line only, second spacer means separating the front surface of said second plate from the rear surface of said third plate and forming a second plurality of chambers for liquid crystals disposed in a single line only, light-transmitting electrodes on the opposite surface of said plates within each of said chambers for applying an electric field across said liquid crystals, a pair of oppositely disposed electrodes in each of said chambers, respectively, defining a liquid crystal cell, said first and second spacer means comprising light-absorbing material, said chambers of said first plurality of chambers being aligned with said chambers of said second plurality of chambers, whereby a direct ray of light penetrating a pair of oppositely disposed electrodes in one chamber of said first plurality of chambers also penetrates a pair of oppositely disposed electrodes in a corresponding chamber in said second plurality of chambers and said light-transmitting electrodes comprising means to apply a source of signals selectively to each of said cells whereby to modulate the light transmitting properties thereof and to selectively expose said recording element during its movement relative thereto.

* * * * *